US006353764B1

(12) United States Patent
Imagawa et al.

(10) Patent No.: US 6,353,764 B1
(45) Date of Patent: Mar. 5, 2002

(54) CONTROL METHOD

(75) Inventors: Taro Imagawa; Michiyo Kamei, both of Hirakata; Tsuyoshi Mekata, Katano, all of (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/199,371

(22) Filed: Nov. 25, 1998

(30) Foreign Application Priority Data

Nov. 27, 1997 (JP) ............................................. 9-325739

(51) Int. Cl.[7] ............................................. G05B 15/00
(52) U.S. Cl. ............................... 700/1; 700/83; 700/90; 700/275
(58) Field of Search ................................. 345/158, 358; 382/288, 168; 700/28, 1, 83, 90, 275, 302–306

(56) References Cited

U.S. PATENT DOCUMENTS

| | | | | |
|---|---|---|---|---|
| 4,843,568 A | * | 6/1989 | Krueger et al. | 382/100 |
| 5,214,615 A | * | 5/1993 | Bauer | 367/128 |
| 5,454,043 A | * | 9/1995 | Freeman | 382/168 |
| 5,594,469 A | * | 1/1997 | Freeman et al. | 345/158 |
| 5,652,849 A | * | 7/1997 | Conway et al. | 345/327 |
| 5,899,855 A | * | 5/1999 | Brown | 600/301 |
| 5,953,693 A | * | 9/1999 | Sakiyama et al. | 704/3 |
| 5,982,853 A | * | 11/1999 | Liebermann | 379/52 |
| 6,002,808 A | * | 12/1999 | Freeman | 382/288 |
| 6,072,494 A | * | 6/2000 | Nguyen | 345/358 |
| 6,100,806 A | * | 8/2000 | Gaukel | 340/573.4 |
| 6,144,755 A | * | 11/2000 | Niyogi et al. | 382/226 |
| 6,198,394 B1 | * | 3/2001 | Jacobsen et al. | 340/573.1 |
| 6,263,260 B1 | * | 7/2001 | Bodmer et al. | 700/275 |

FOREIGN PATENT DOCUMENTS

| | | |
|---|---|---|
| EP | 0 600 605 | 6/1994 |
| EP | 0 694 833 | 1/1996 |
| JP | 8-211979 | 8/1996 |
| JP | 8-315154 | 11/1996 |
| JP | 9-81309 | 3/1997 |

OTHER PUBLICATIONS

Yasuhito Suenaga et al.; "Human Reader: An Advanced Man–Machine Interface Based on Human Images and Speech," Systems & Computers In Japan, US, Scripta Technica Journals, vol. 24, No. 2, Jan. 1, 1993, pp. 88–101.

Pavlovic V I et al.; "Visual Interpretation of Hand Gestures for Human–Computer Interaction: A Review", IEEE Transaction on Pattern Analysis and Machine Intelligence, U.S., IEEE Inc., vol. 19, No. 7, Jul. 1, 1997, pp. 677–695.

"Diurnal Sound Control for Personal Computers"; IBM Technical Disclosure Bulletin, vol. 36, No. 10, Oct. 10, 1993, p. 549–552.

"Light–Controlled Software Products"; IBM Technical Disclosure Bulletin, vol. 35, No. 3, 8/92, p. 267–269.

European Search Report Corresponding to Application No. EP 9812 2162 dated Jul. 5, 2000.

* cited by examiner

Primary Examiner—William Grant
Assistant Examiner—Ronald D Hartman, Jr.
(74) Attorney, Agent, or Firm—Ratner & Prestia, PC

(57) ABSTRACT

A control method is to monitor a person's attributes and based on the results, in predetermined content of the control, to control equipment to be controlled, further, to monitor said person's peripheral environment and also by using these results to execute said control.

6 Claims, 10 Drawing Sheets

CONTROL METHOD

BACKGROUND OF THE INVENTION

1. Field of the Invention

The present invention relates to a technique for operating equipment, manipulating information, or controlling environments based on people's motions, postures, and conditions.

2. Related Art of the Invention

Certain conventional techniques for detecting people's motions to operate equipment recognizes people's gestures to operate televisions. (Japanese Patent Applications Laid Open No. 8-315154 and No. 8-211979). Japanese Patent Application Laid Open No. 8-315154 uses a camera to detect the position of the palm of a person's hand and his or her gesture in order to operate a television.

Japanese Patent Application Laid Open No. 8-211979 uses the position and shape of a person's hand detected by a camera to input characters to a portable personal computer.

These conventional approaches, however, fundamentally requires a person and an apparatus operated by the person to correspond on a one-to-one basis, and desirable operations are difficult to perform if there are multiple televisions or personal computers near the person or if there are multiple operators.

In general, there are often multiple apparatuses and people in a house or an office or out of doors, so if this apparatus is controlled using people's motions, the people must be individually associated with the apparatuses. If, for example, multiple televisions are simultaneously operated, the conventional approaches do not allow a television to be operated or being operated to be distinguished. In addition, if there are several people in the room, the conventional approaches cannot determine who is changing the television channels or who can change the channels.

SUMMARY OF THE INVENTION

In view of these problems of the conventional apparatus, it is an object of this invention to provide a control method that can determine, despite the presence of multiple apparatuses and people in the neighborhood, the correspondence between the apparatuses and people to smoothly operate the apparatuses using the people's motions, postures, and conditions.

This invention provides a control method characterized in that the attributes of one or several people are continuously or intermittently monitored to control predetermined equipment based on the detection of the people's predetermined attribute. This invention also provides a control method characterized in that candidates for a control object and the content of control are determined based on the people's predetermined attribute and in that a control object and the content of control are determined based on the candidates for a control object and the content of control. Furthermore, this invention provides a control method characterized in that based on the detection of the attributes of the several people, candidates for a control object and the content of control are determined for each of the people and in that a control object and the content of control are determined based on the candidates for a control object and the content of control.

DETAILED DESCRIPTION OF THE PREFERRED EMBODIMENTS

Figure 1:
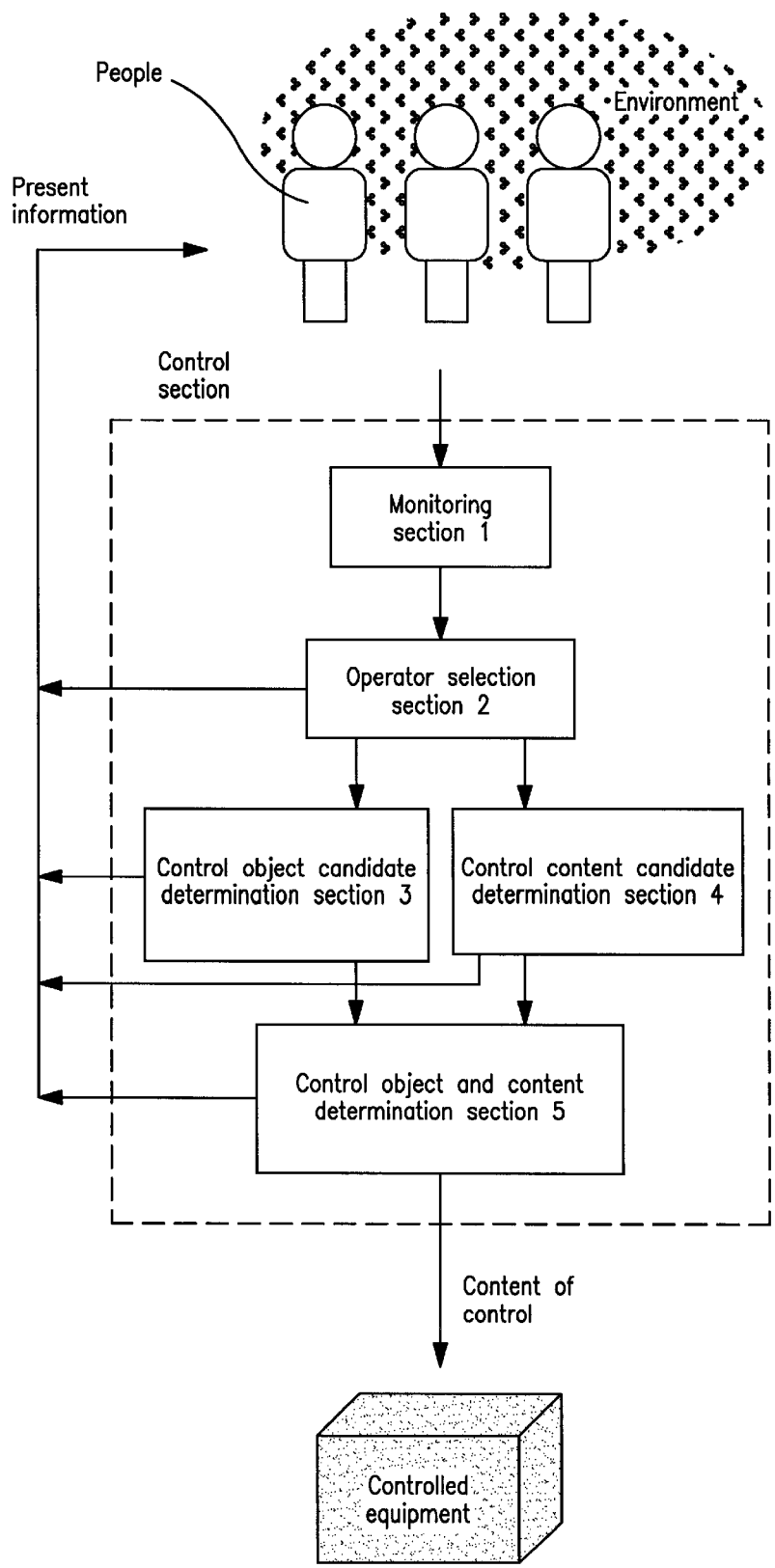
FIG. 1 is a block diagram showing a first embodiment of this invention.

Embodiments of this invention are described below with reference to the drawings. FIG. 1 is a block diagram showing a first embodiment of this invention. In this figure, 1 is a monitoring section, 2 is an operator selection section, 3 is a control object candidate determination section, 4 is a control content candidate determination section, and 5 is a control object and content determination section.

In FIG. 1 the monitoring section 1 continuously monitors people's attributes and their peripheral environment. The people's attributes include people's positions, postures, faces, expressions, eyes or head direction, motions, voices, physiological conditions, identities, forms, weights, sexes, ages, physical and mental handicaps, and belongings. The physical and mental handicaps include visual, physical, vocal, and auditory handicaps and the disability to understand language. The belongings includes clothes, caps, glasses, bags, and shoes.

The monitoring means include a camera (that is sensitive to visible light or infrared rays), a microphone, a pressure sensor, a supersonic sensor, a vibration sensor, a chemical sensor, and a photosensor. Other sensors may be used. The camera can be used to monitor people's positions, postures, faces, expressions, motions, forms, and belongings in a non-contact manner.

If a person's position is monitored by a camera, a position at which that person is present is assumed to be an area of an image in which a flesh color is present. The position at which a person is present may be a area of an image including a different color or illuminance or a area of an image in which infrared rays of wavelength 3 to 5 $\mu$m or 8 to 12 $\mu$m emitted mostly by people are detected if infrared images are also used. If the person's posture, form, or motion is monitored by the camera, a method similar to that for detecting the person's position is used to extract the person's rough shape in order to monitor his or her posture or form based on the shape while monitoring the temporal change in posture to monitor his or her motion.

To determine, for example, whether the person is standing or sitting or in which direction he or she is reaching out, representative shapes for the respective postures can be registered beforehand and compared with the person's image. If the person's face or expression or the direction of his or her head or eyes is monitored by the camera, the head located at the top of his or her body can be detected based on the above shape, and his or her expression can be compared with registered images of his or her faces including various expressions in order to monitor his or her face and expressions. The direction of the head or eyes can be determined by detecting the positions of the eyes from the image of the head detected using the above procedure. If the positions of the eyes are symmetrical about the head, the head can be determined to face frontward relative to the camera, whereas if the eyes are biased to the right or left, the head can be determined to face rightward or leftward. The positions of the eyes can be detected by detecting an elliptical or flat area of the face which is darker within the face. Moreover, the directions of the eyes can be detected by detecting the circular area of the iris at the center of the overall eye and determining the offset between the center of the circular area and the center of the overall area of the eye. If the person's belonging is detected by the camera, it can be determined for the person's area detected using the above procedure that there is a belonging in a portion of the body in which a color is detected that differs from the person's color detected when he or she wears no clothes. Determinations can also be made by registering beforehand belongings having particular colors. The glasses can be identified by determined whether there is a shape of a frame around the eyes when the positions of the face and eyes are detected using the above procedure. In addition, a microphone can be used to monitor in a non-contact manner the person's voices or sound generated by his or her motion (sound produced when the person claps his or her hands or snaps his or her fingers or footsteps). In addition, the physiological condition such as the sound of a heatbeat can be measured from a close or contact position. A pressure sensor can be used to monitor contacts associated with the person's motion or can be installed on the floor surface to monitor his or her weight or walking pattern. In addition, a supersonic sensor can be used to monitor the distance to the person or his or her motion based on a change in distance to him or her. The use of supersonic waves enables the person's position to be monitored even if lighting noticeably varies or there is no lighting.

In addition, a vibration sensor can be used to monitor vibration generated by the person's motion. The physiological conditions can be monitored using a chemical sensor for measuring the quantities of chemical substances such as the concentration of ions or the quantity of sugar or hormone in secretion, excreta, or body fluids, or a photosensor for measuring a spectrum distribution of light transmitting a body. In addition, based on information such as the features of the face or the motion of the body obtained by the camera, the features of the voice obtained by the microphone, or the weight obtained by the pressure sensor, the person's identity, sex, age, or physical and mental handicap can be assumed. For example, if the features of the face of a particular person, and his or her weight, form, sex, age, and physical and mental handicap are registered beforehand and if one of the features (for example, weight) is used to identify this person, the other features such as sex are known.

In addition, multiple cameras of different views can be used to three-dimensionally determine the person's position, posture, and motion, to improve the monitoring accuracy, and to extend the monitoring range. Likewise, multiple sensors of different natures can be combined together to improve the accuracy and reliability of the detection of the person's position, posture, or motion.

People and their environment may be intermittently monitored, and when the people's attributes do not significantly vary or the control object does not require fast control, the intermittent monitoring can reduce the throughput of the series of control operations and thus calculation resources and energy consumption.

In FIG. 1, the operator selection section 2 selects an operator based on the results of monitoring by the monitoring section 1. The monitoring section is assumed to monitor three people. The operator selection section 2 selects one from the three people based on a people's predetermined attribute monitored by the monitoring section 1. The selection based on the predetermined attribute refers to the selection of a person closest to a predetermined position (for example, the center of a room), a person who has assumed a predetermined posture or has made a predetermined motion (for example, raising his or her hand), a person of the top priority based on predetermined people's priorities (for example, within a family, the order of father, mother, and children) (the priorities can be given based on weight, sex, age, physiological condition, or physical and mental handicap), a person who has spoken a particular word (for example, "yes" or the name of an apparatus), a person having a particular belonging (for example, a red ball in his or her hand), or a person directing his or her eyes or head toward a particular position (for example, an ornament). In addition, the operator selection section 2 may determine an evaluation value for each person based on an evaluation method predetermined based on people's attributes in order to select a person having an evaluation value that is larger than a reference value and that is also the largest. In this case, the attributes of various people can be taken into consideration. The evaluation method may use the weighted sum of the strength of a voice given when the person says "yes" and the speed at which the person raises his or her hand.

Next, the operator selection section 2 presents information on the selected person. If, for example, the name of the selected person can be identified, it may be displayed on a display screen or output as a voice, or music, sound, or an uttered name associated with the person beforehand may be output, or a symbol or characters associated with the person beforehand may be displayed on the display screen, or a signal may be transmitted to a device carried by the person. The device carried by the person can provide the information to the person by vibrating or outputting light or sound. Alternatively, a light may be directed to the selected person, or a device such as a display may be rotated and directed to the selected person, or an image of the selected person photographed by a camera may be displayed on the display screen. A voice saying "What do you want?", or sound or light may be output to only the selected person immediately after his or her utterance or motion in order to inform the people of the selected person.

Although, in the above example, the operator selection section 2 selects one from the three people, several (for example, 2) people may be selected or no person may be selected if the predetermined attribute cannot be monitored.

In FIG. 1, 3 is the control object candidate determination section for determining candidates for a control object based on the predetermined attribute of the person selected by the operator selection section 2 and his or her peripheral environment. The control object may include equipment (inside a house, an air conditioner, a television, a video, a light, a washer, a personal computer, a game machine, or a pet robot; outside a house, an elevator or a car) or information or the contents of display used in information equipment (characters or graphics displayed on a display screen). The predetermined attribute of the selected person may include an indicating posture with his or her finer, gaze, or head, the utterance of particular words, sign language, or the holding of a particular article. If the indicating posture with the person's finger, gaze, or head is used, candidates for a control object will be equipment near the indicated position or the contents of display on the display screen. The peripheral environment may include temperature, humidity, illuminance, sound volume, the condition of air currents, the concentration of a particular gas (carbon dioxide) in the air, or time. If the indoor temperature or humidity is high, the control object may be an air conditioner, a fan, or a dehumidifier. If the indoor illuminance is low or a particular time (before sunset) has come, the control object may be lighting. If the air current does not vary over a long period of time or the concentration of carbon dioxide in the air exceeds the reference value, the control object may be a fan or window. If the outdoor sound exceeds the reference value, the control object may be a television or a window.

There may be one or several candidates. If, for example, the person selected as the operator is pointing toward an air conditioner and a television, both of them are to be controlled. If the utterance of words or sign language is used as a predetermined attribute, the name of the apparatus may be indicated or predetermined words may be uttered. For example, the uttered word "television" allows a television (or televisions) to be used as a candidate for a control object, and the uttered word "hot" allows a fan and an air conditioner to be used as candidates for control objects. If the holding of a particular article is used as a predetermined attribute, equipment and articles may be mutually associated before hand. For example, by associating a red ball with the air conditioner and associating a blue ball with the television, the holding of the blue ball allows the television to be used as a candidate for a control object.

Next, the control object candidate determination section 3 externally presents information on determined candidates for control objects. To present information, a name indicating a control object may be output as a voice or sound or a name for a control object may be displayed on the display screen. Alternatively, a light included in an apparatus that is a candidate for a control object may be turned on or a speaker included in an apparatus that is a candidate for a control object may output a sound or voice.

In FIG. 1, the control content candidate determination section 4 determines candidates for the content of control based on the predetermined attribute of the person selected by the operator selection section 2 and his or her peripheral environment. The content of control may include switching on and off equipment, changing operation parameters (sound volume, wind quantity or direction, channels, or light quantity) of the equipment, opening and closing a door or window, moving or modifying an object on the display of information equipment, changing the color of an object, or editing a document.

The predetermined attribute may include the use of a voice or sign language to indicate the content of control (for example, the utterance of the word "on" for switching on, the utterance of the word "off" for switching off, or the utterance of the word "hot" for switching on) or predetermined motions may be associated with the content of control beforehand (clapping hands once for switching on and clapping hands twice for switching off). There may be one or several candidates. If the person selected as the operator utters the word "up", the candidate may be an increase in the volume of the television or the set temperature for the air conditioner, or the moving to information of an object displayed on the display of information equipment.

The peripheral environment may include temperature, humidity, illuminance, sound volume, the condition of air currents, the concentration of a particular gas (carbon dioxide) in the air, or time. If the indoor temperature or humidity is high, candidates for content of the control may be the switching-on and increasing operation force of an air conditioner, a fan, or a dehumidifier.

If the indoor illuminance is low or a particular time (before sunset) has come, the candidates for the content of control may be the switching-on of lighting or increasing light quantity. If the air current does not vary over a long period of time or the concentration of carbon dioxide in the air exceeds the reference value, candidates for the content of control may be the switching-on of the fan or the opening of the window. If the outdoor sound exceeds the reference value, candidates for the content of control may be an increase in the sound volume of the television or the closing of the window.

Next, the control content candidate determination section 4 presents information on the determined candidates for the content of control. To present information, a name indicating the content of control may be output as a voice or sound or displayed on the display screen.

In FIG. 1, the control object and content determination section 5 determines a control object and the content of control based on the candidates for a control object determined by the control object candidate determination section 3 and the candidates for the content of control determined by the control content candidate determination section 4, and then effects the determined control on the determined control object. The control object and the content of control are identified by limiting the candidates for a control object and the content of control. To limit the candidates, a predetermined combination of the candidates for a control object and the content of control is selected. For example, if the candidates for a control object are the television and air conditioner and the candidate for the content of control is to "increase the temperature" and if this content is not provided for the television but for the air conditioner, then the control object will be the air conditioner and the content of control will be to increase the set temperature for the air conditioner. In addition, when as the limitation of the candidates, the air conditioner is selected as a candidate for a control object based on the person's indicating motion and increasing the temperature for the air conditioner is selected as a candidate for the content of control based on the person's uttered word "increase", the control object and the content of control are not selected if the time interval between the time T1 at which the indicating motion was monitored and the time T2 at which the uttered word "increase" was monitored is larger than or equal to the reference value (for example, three seconds). Likewise, if the time T2 precedes the time T1, the control object and the content of control are not selected. In this manner, the candidates can be limited by taking the time interval or order between the times T1 and T2 into account. This technique can reduce the rate of misjudgment caused by a combination of the accidental occurrence of this indicating motion and the accidental utterance of this word during conversation. In addition, even if the duration of the indicating motion is smaller than the reference value (for example, equal to or more than 1 second), the control object is neither selected. This can reduce the rate of misjudgment if this indicating motion is accidentally made as a daily motion. This limitation may not be provided (if, for example, there is only one candidate or multiple control objects are simultaneously controlled) when there is no need for limitation.

Next, the control object and content determination section 5 presents the information on determined control object and content of control. The determined control object and content of control can be presented as in the presentation of the candidates for a control object or the content of control.

In addition, the control object and content determination section 5 may indicate confirmation, indicate the needs for reentry, or present information such as candidate selections and the disability to determine the control object. With the indication of confirmation, execution is confirmed for the determined control object and content of control by uttering the word "OK?", displaying it on the display screen, or outputting a predetermined sound. The indication of the needs for reentry and of the disability to determine the object urge reentry if the control object and content of control cannot be determined easily (for example, the people's predetermined attribute is ambiguous) by uttering the words "Enter data again", displaying them on the display screen, or outputting a predetermined sound. With the candidate selections, if there are multiple control objects and contents of control, the selections are displayed on the display screen to urge selection.

In addition, the monitoring section 1 monitors the attributes of the operator after the control object and content determination section 5 has presented information, and the control object and content determination section 5 limits the candidates for a control object and the content of control, determines a control object and the content of control, and presents information again. The reduction of the control objects and contents of control may be repeated based on the presentation of information and the monitoring of the person's attribute after presentation. The repetition can reduce the number of candidates. To confirm execution after the control object and content determination section 5 has presented information, the uttered word "Yes" is monitored as the operator's attribute to control the control object. If the selections of candidates are displayed on the display screen, they are numbered and the uttered words indicating these numbers are monitored to control the control object. The control object determination section 3 and content determination section 4 may urge selection from the candidates. In this case, since the person selects a particular object and content from the candidates, the control object and content determination section 5 determines a control object and the content of control based on this action of selection.

The operation of the first embodiment of this invention configured in the above manner is described below. It is assumed that there are three people A, B, and C in a room and that there are an air conditioner, a television, and a fan in this room. The monitoring section 1 continuously monitors the people's attributes and their peripheral environment. If A and B point to the television, the operator selection section 2 considers B, who preceded A in pointing to the television, to be an operator and outputs B's name as a voice. Then, it is known that A cannot operate the television whereas B can do it, so this apparatus can be controlled without confusion despite the presence of the several people.

In addition to the outputting of B's name as a voice, the operator selection section 2 can present information on the operator by displaying the name of the selected person on the display screen, outputting music, sound, or an uttered name as sounds associated with the person beforehand, displaying on the display screen a symbol or characters associated with the person beforehand, or transmitting a signal to a device carried by the person. The device carried by the person can provide the information to the person by vibrating or outputting light or sound. Alternatively, a light may be directed to the selected person, or a device such as a display may be rotated and directed to the selected person, or an image of the selected person photographed by a camera may be displayed on the display screen. A voice saying "What do you want?", or sound or light may be output to only the selected person immediately after his or her utterance or motion in order to inform the people of the selected person. By informing the people of the selected operator in this manner, they know who can operate the apparatus, and confusion can be avoided even if several people attempt to operate it.

The control object candidate determination section 3 determines candidates for control object based on the predetermined attribute of the person selected by the operator selection section 2 or his or her peripheral environment. If B is pointing to the neighborhood of the television and air conditioner, the television and air conditioner are determined as candidates for a control object. Even if the air conditioner is away from the location to which B is pointing, it is included as a candidate for a control object if the room temperature, which is a peripheral environment, is high. Next, the control object candidate determination section 3 presents information on the determined candidates for a control object. The information may be presented by outputting the names of the control objects as voices or sounds or displaying them on the display screen. Alternatively, a light included in the candidate apparatus for control object may be turned on, or a sound or voice may be output from a speaker included in the candidate apparatus for a control object. The presentation of the information on the candidates for a control object enables the operator to check whether a desired object is included in the candidates. The selection of the plurality of candidates enables the desired control object to be reliably included in the candidates.

The control content candidate determination section 4 determines candidates for the content of control based on the predetermined attribute of the person selected by the operator selection section 2 or his or her peripheral environment. If B says "Strong" while simultaneously pointing to a certain location, the candidates for the content of control will be an increase in wind force, cooling or warming performance, or illuminance.

Next, the control content candidate determination section 4 presents information on the determined candidates for the content of control. The information may be presented by outputting names for the contents of control objects as voices or sounds or displaying them on the display screen. The presentation of the information on the candidates for the content of control enables the operator to check whether a desired content is included in the candidates. The selection of the plurality of candidates enables the desired content of control to be reliably included in the candidates.

If there are a large number of control objects and contents of control, the information on all of them need not be presented.

The control object and content determination section 5 determines a control object and the content of control based on the candidates for a control object determined by the control object determination section 3 and the candidates for the content of control determined by the control content determination section 4, and then effects the determined control on the determined control object. The method described below can be used to determine a control object and the content of control from their candidates. That is, only a predetermined combination of a candidate for a control object and a candidate for the content of control is adopted. In the above case, if the candidates for a control object are the television and air conditioner and there are four candidates for the content of control, that is, an increase in wind force, cooling and warming performance, and illuminance, the television cannot be combined with the candidates for the content of control, so the air conditioner is selected as a control object and the content of control that can be combined with the air conditioner is limited to an increase in wind force and cooling and warming performance. Moreover, by monitoring the temperature or season as the people's environment, the increase in heating performance can be excluded as the content of control if the temperature exceeds 30° C. or if it is in summer. In addition, by recording the history of the people's control beforehand, the combinations of control objects and contents of control that have not been used before can be excluded.

In this manner, the control object and content determination section 5 determines a control object and the content of control based on their candidates and the peripheral environment, so the control object and content of control can be more reliably identified even if it is difficult to identify them separately only from the predetermined attributes of people. In particular, if an ambiguous attribute of a person such as his or her motion or posture is used, determinations are difficult even with very accurate recognition. The present approach, however, enables a desired control object and the desired content of control to be selected using the daily motion or posture of the person and without forcing him or her to make a clear motion.

Next, the control object and content determination section 5 presents the information on determined control object and content of control. The determined control object and content of control can be presented as in the presentation of the candidates for a control object or the content of control. The presentation of the information on the control object and the content of control enables the operator to check whether a desired control object and the desired content of control have been selected.

In addition, the control object and content determination section 5 may indicate confirmation, indicate the needs for reentry, or present information such as candidate selections and the disability to determine the control object. With the indication of confirmation, execution is confirmed for the determined control object and content of control by uttering the word "OK?", displaying it on the display screen, or outputting a predetermined sound. The confirmation can prevent erroneous control. The indication of the needs for reentry and of the disability to determine the object urge reentry if the control object and content of control cannot be determined easily. In this case, reselection is urged by uttering the words "Enter data again", displaying them on the display screen, or outputting a predetermined sound or displaying the selections on the display screen. In the above case, the operator is prompted to aurally indicate again whether to increase the wind force of the air conditioner or its cooling performance. Then, the monitoring section 1 monitors the attributes of the operator after the control object and content determination section 5 has presented information, and the control object and content determination section 5 limits the candidates for a control object and the content of control, determines a control object and the content of control, and presents information again. In the above case, when the person says "Wind", the control object and content determination section 5 determines the content of control as an increase in the wind force of the air conditioner and then aurally indicates that it will increase the wind force of the air conditioner while transmitting a control signal to the conditioner. The reduction of the control objects and contents of control may be repeated based on the presentation of information and the monitoring of the people's attribute after presentation. The repetition can reduce the number of candidates without misjudgments.

In this manner, by indicating the needs for reentry if the control object or content of control cannot be identified, misjudgment caused by a forced judgment can be prevented and the equipment or information can be smoothly controlled using the people's attribute such as their motion or posture while permitting the ambiguity of such an attribute.

Figure 9D:
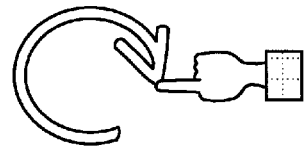
FIGS. 9a–9h are illustrations showing various motions of people's hand or finger.
Figure 9C:
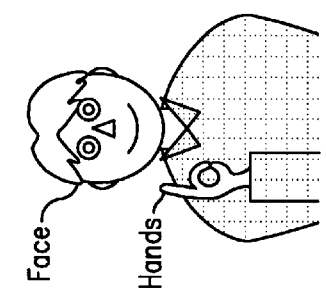
Figure 9A:
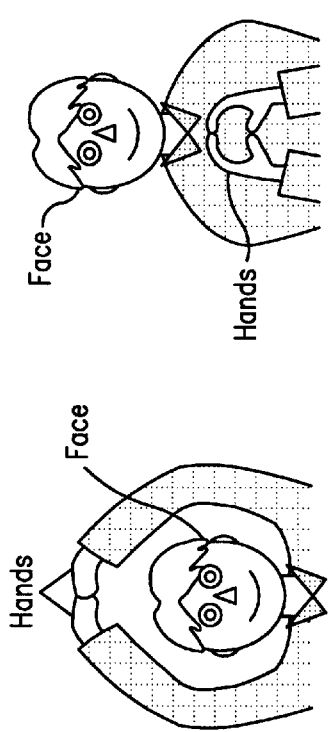
Figure 9B:
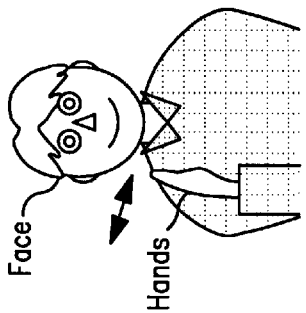
Figure 9H:
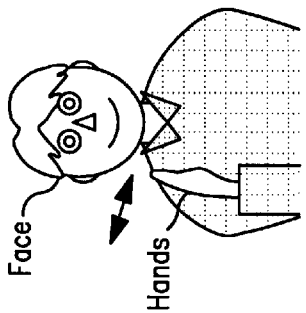
Figure 9G:
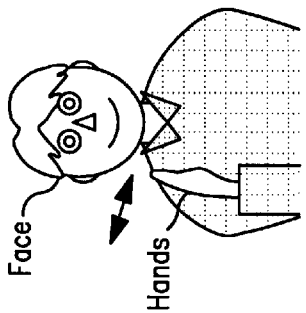
Figure 9F:
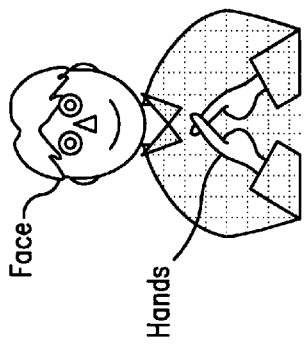
Figure 9E:
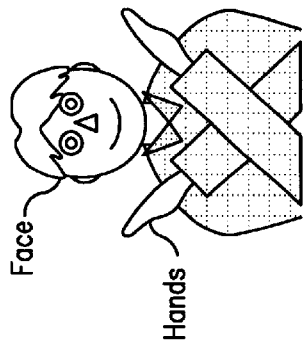

Meanwhile in the above embodiments when the reentry from people is monitored, the voice is used as the people's attribute but another attribute (specific movement etc.) or combination thereof can be used. For example when the control object and content of control which are determined by the control object and content determination section 5 are presented to urge the people to determine, people make circle figure by using arm, hand or finger (see FIGS. 9a–9d, put up thumb (see FIG. 9e) and then the control object and content determination section 5 determines the presented matter as the control object and content of control. Further when the people make configuration of "X" by arm or finger(see FIG. 9f, 9g), or shake their hand in a horizontal direction(see FIG. 9h). The control object and content determination section 5 does not adopt the presented matter as the control object and content of control but urge reentry.

Although in the above example, the pointing motion or posture is used as the people's attribute in determining an operator and candidates for a control object, other attributes (other indicating motions such as the direction of the eyes or head and a voice, or motions or postures other than the indicating motions) and their combinations may be used. If, for example, the people's position is used as their attribute, a person such as one in the next room who is not related to the operation of the television is prevented from being mistakenly selected for an operator. The use of the people's posture as an attribute, for example, enables a sitting person to be given top priority and prevents the accidental motion of a person who happens to pass the room from being mistakenly selected. In addition, using the people's face, expressions, identity, or age as their attribute, those who are limited in the use of the television or who operate the television inappropriately can be excluded from the candidates for an operator (for example, children cannot operate the television after nine p.m.). Using the people's physical and mental handicap, sex, or physiological condition as their attribute, an appropriate person can be given top priority in operation based on this attribute. Using the people's belonging, an ordinary article can act as a remote controller (for example, holding a red ball indicates the television), a motion that the user can use easily or the user's favorable motion can be used to select the television, and the top priority among several people (who holds the red ball first) for operating the television can be visibly presented.

In addition, a combination of multiple attributes (a voice and the direction of the eyes) enables the equipment to be smoothly operated without forcing the person to make a particular motion. For example, by combining the uttered word "television" and the direction of the eyes to the television, an erroneous reaction to an accidental motion (the uttered word "television" during conversation) can be prevented.

The operator can also be appropriately selected by combining the people's attribute with their peripheral environment. If, for example, the fan is to be operated and if the concentration of a particular gas (carbon dioxide) in the air is monitored as the people's peripheral environment, an appropriate person can be selected as an operator for the fan based on the people's sensitivity to the environment (those who have a headache when the concentration of carbon dioxide is high). In the operation of the air conditioner, by monitoring the temperature, humidity, or air current condition as the people's peripheral environment and registering their sensitivity to the environment (those who are sensitive to the heat or cold and whose skin is likely to be dry in winter) beforehand, a person who is sensitive to the heat is given top priority in operating the air conditioner if the temperature and humidity are high and if there are few indoor air currents. If the sound volume of the television is to be controlled and if the outdoor sound, which is the people's peripheral environment, is loud, an appropriate person can be selected as an operator for the television based on the people's sensitivity to the environment (those who have difficulty in hearing sound). When the illuminance of the lighting is to be changed, the indoor and outdoor illuminances are monitored as the people's peripheral environment to enable an appropriate person to be selected as an operator for the lighting based on the people's sensitivity to the environment (those who have difficulty in reading characters when dark). If the time is monitored as a peripheral environment, the use time can be limited depending on the person. For example, it is possible to prevent children from operating the television after nine p.m.

Figure 10A:
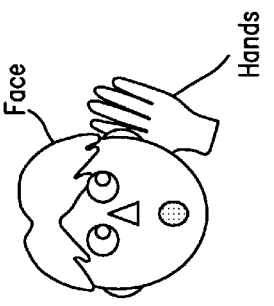
FIGS. 10a–10i are illustrations showing various motions of people's hand or finger.
Figure 10B:
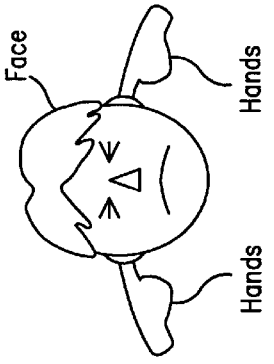
Figure 10C:
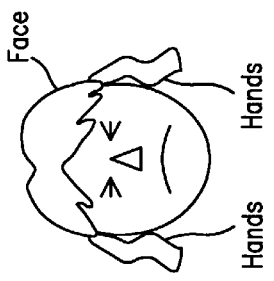
Figure 10D:
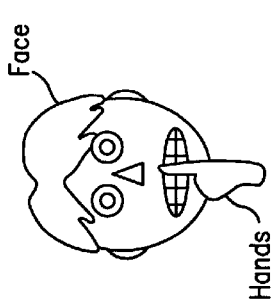
Figures 10E, 10F, 10G, 10H, 10I:
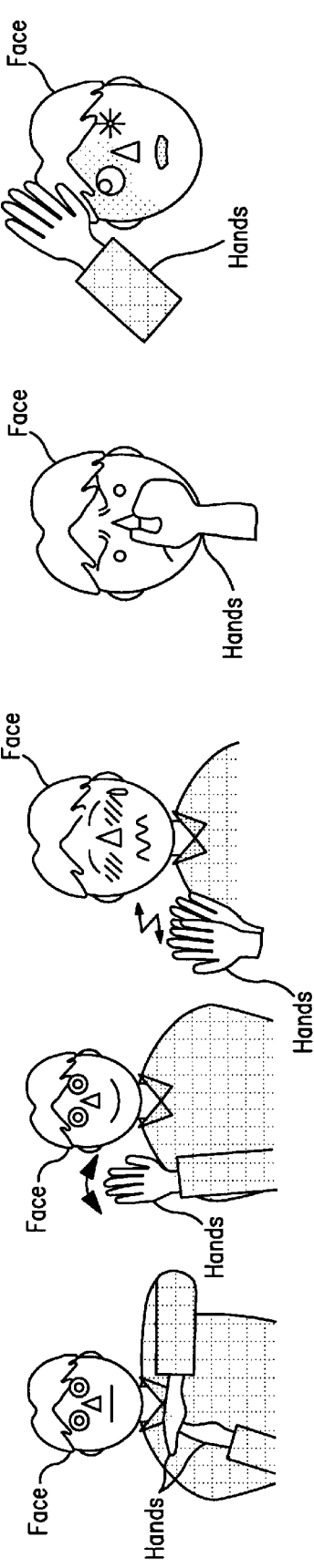

Likewise, although the above example uses a voice as the people's attribute in determining the candidates for the content of control, other attributes (other motions or postures) and their combinations may be used. For example, by using a motion as the people's attribute, the equipment can be naturally controlled as in conversation with the people. Examples of such a motion include applying the forefinger to the front of the mouth (see FIG. 10*a*) or plugging the ears (see FIGS. 10*b* and 10*c*) to reduce the sound volume of the television, and keeping the hands near the respective ears (see FIG. 10*d*) to increase the sound volume of the television. Further the reproduction of a video etc. is temporally stopped by making such configuration of "T" with using both hands (see FIG. 10*e*) or the switch of TV is put off by shaking the hand to present "good bye" (see FIG. 10*f*).

In addition, although, in the above example, the attribute used to determine the candidates for a control object differs from the attribute used to determine the candidates for the content of control, only one attribute can be used to determine the candidates for both a control object and the content of control. Examples are shown below. It is assumed that there are people in a room and that there are an air conditioner, a television, a fan, an air cleaner, a telephone, a desk, and a bed in the room.

When a person makes a motion of applying forefinger to the front of the mouth or plugging the ears with the hands, the control object candidate determination section 3 determines as a candidate the television that outputs sound, and the control content candidate determination section 4 determines the reduction of the sound volume as a candidate for the content of control. When a person picks up the telephone receiver, the control object candidate determination section 3 determines as a candidate the television that outputs sound, and the control content candidate determination section 4 determines the reduction of the sound volume as a candidate for the content of control. When a person uses the hand to fan the face or body (see FIG. 10*g*) or says "Hot", the control object candidate determination section 3 determines as a candidate the air conditioner, window or fan that relates to air conditioning, and the control content candidate determination section 4 determines as candidates for the content of control switching-on, the reduction of the set temperature, the opening of the window, the putting on of switch of the fan, and the increasing the volume of window. Further people pinch their nose (see FIG. 10*h*) to the control object candidate determination section 3 determines the air cleaner or window as the candidate, and the control content candidate determination section 4 puts on the switch of the air cleaner or opens the window. When a person says "good-bye" or "bye-bye" during conversation, the control object candidate determination section 3 determines the telephone as a candidate, and the control content candidate determination section 4 determines the disconnection of the telephone line as candidates for the content of control. When a person sits in a chair and opens a book or holds something to write with, the control object candidate determination section 3 determines as a candidate the lighting in the room and the lighting attached to the desk, and the control content candidate determination section 4 determines switching-on as candidates for the content of control. When a person has been sleeping in bed over a specified period of time, the control object candidate determination section 3 determines the lighting in the room as a candidate, and the control content candidate determination section 4 determines switching-off as candidates for the content of control. Further when people shut a light by holding up their hand or a member above their eyes (see FIG. 10*i*), or when people indicate such expression as if light dazzled their eyes, or they say "dazzling", the control object candidate determination section 3 determines the light source in a room as a candidate and the control content candidate determination section 4 determines the making the light dark or switching off as a candidate.

As described above, the first embodiment of this invention enables the people's daily attributes to be used to control the equipment smoothly without the use of a remote controller. In addition, even if there are several people or apparatuses, this embodiment can reduce misjudgment and execute control without the needs for complicate indicating motions.

Figure 2:
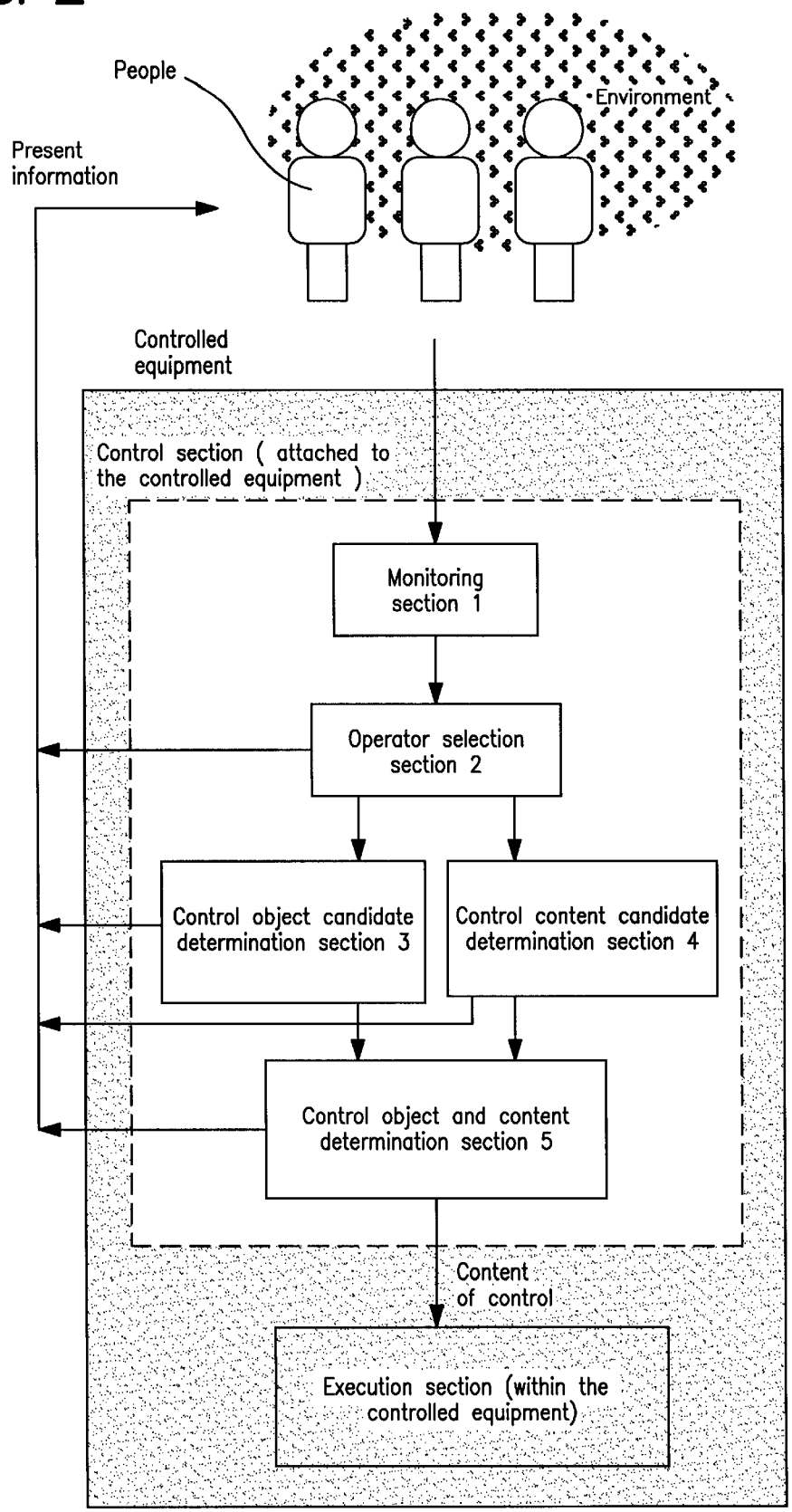
FIG. 2 is a block diagram showing a second embodiment of this invention.

FIG. 2 is a block diagram showing a second embodiment of the invention. In this figure, the configuration of this embodiment and the operation of each section are the same as in the first embodiment. According to the second embodiment, however, the monitoring section 1, operator selection section 2, control object candidate determination section 3, control content candidate determination section 4, and control object and content determination section 5 are attached to an apparatus to be controlled. If, for example, a television incorporates each of these sections, the control object candidate determination section 3 determines whether the television is a candidate. Based on the people's predetermined attribute, for example, the uttered words "Switch the channel", the control content candidate determination section 4 determines the switching of the channel as a candidate for the content of control, and since the switching of the channel is included in the contents of control for the television, the control object and content determination section 5 switches the channel.

Thus, the second embodiment of this invention not only provide the same effects as those of the first embodiment but also only requires the control object candidate determination section 3 of the apparatus to determine whether the apparatus has been selected, thereby reducing the amount of processing required to determine candidates for a control object compared to the first embodiment. It is also advantageous that despite the arbitrary movement of the apparatus, the processing executed by the apparatus to determine candidates for a control object does not need to be changed.

Figure 3:
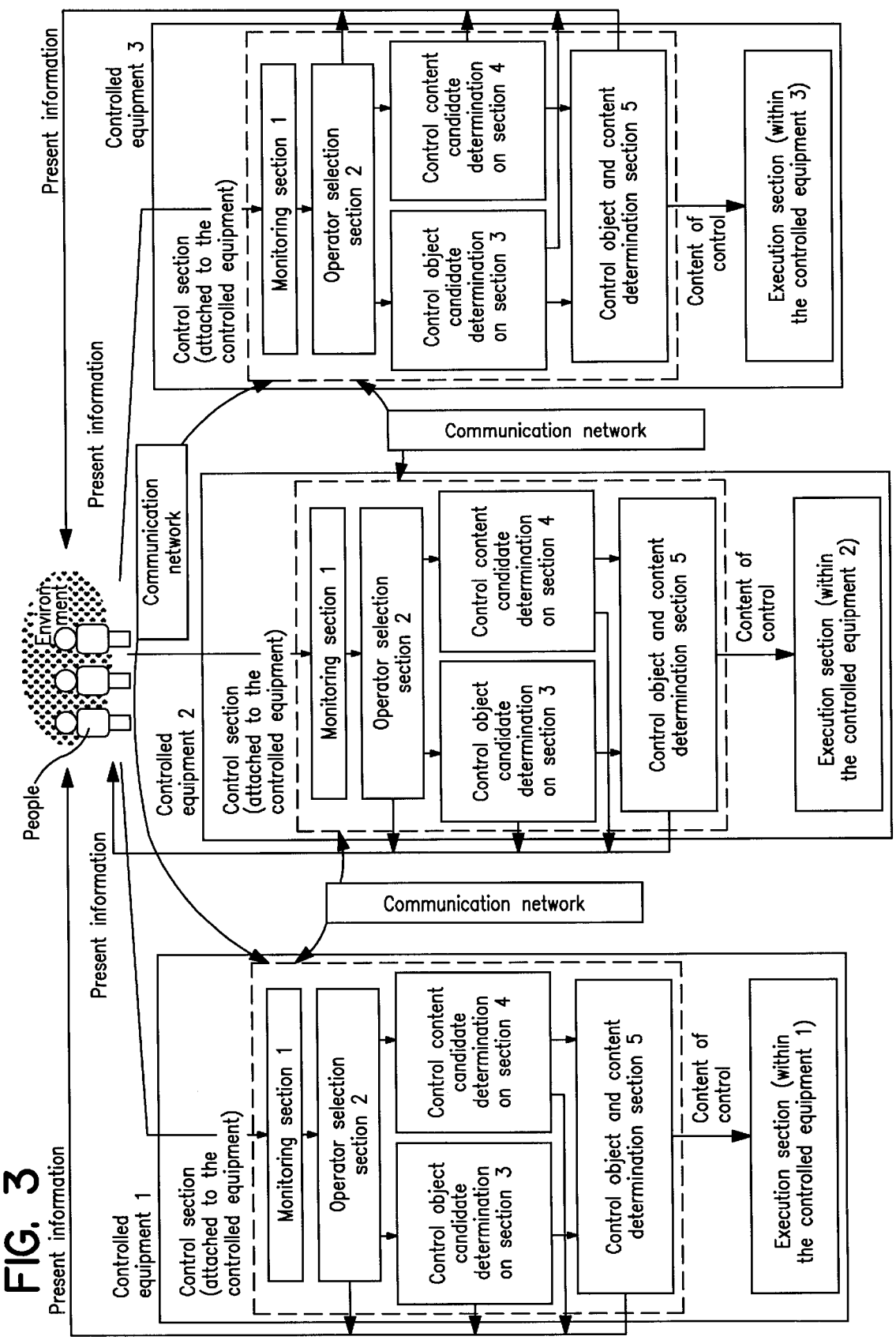
FIG. 3 is a block diagram showing a third embodiment of this invention.

FIG. 3 is a block diagram showing a third embodiment of this invention. In this figure, the configurations of apparatuses to be controlled 1, 2, and 3 and the operation of each section are the same as in the equipment to be controlled in the second embodiment (the control objects 1, 2, and 3 are, for example, a television, an air conditioner, and a fan, respectively). The third embodiment, however, includes multiple apparatuses to be controlled. The monitoring section 1 outputs monitored contents to a communication network, the operator selection section 2 outputs information on a selected attribute of the people to the communication network, the control object candidate determination section 3 outputs information on determined candidates for a control object (whether the apparatus to which this section belongs is a candidate or the degree to which this apparatus is considered to be a candidate) to the communication network, the control content candidate determination section 4 outputs information on the determined content of control to the communication network, and the control object and content determination section 5 outputs information on the control object and content of control to the communication network.

The operator selection section 2 selects an operator based on information obtained from the communication network and information from the monitoring section 1 in order to present information on the operator, and the control object candidate determination section 3 determines candidates for a control object based on the information obtained from the communication network and the information from the monitoring section in order to present information on the candidates for a control object. The control content candidate determination section 4 determines candidates for the content of control based on the information obtained from the communication network and the information from the monitoring section in order to present information on the candidates for the content of control, and the control object and content determination section 5 presents information on the control object and content of control based on the information obtained from the communication network and the candidates for a control object determined by the control object candidate determination section 3 and the candidates for the content of control determined by the control content candidate determination section 4, and then effects the control on the control object. This embodiment differs from the second embodiment in that due to the presence of the plurality of control apparatuses, control unintended by the operator may be provided when each apparatus individually determines a control object and the content of control. For example, if a person points to the intermediate point between the television (a control object 1) and the air conditioner (a control object 2) and says "Switch on", both the television (the control object 1) and the air conditioner (the control object 2) are switched on even if only the television (the control object 1) to be operated.

In this case, by obtaining, for the other controlled apparatuses, information on the candidates for a control object and the content of control and on the control object and the content of control, the candidates for a control object and the content of control can be limited as in the first embodiment. When, for example, the control object candidate determination section of the television (the control object 1) outputs "television" to the communication network as a candidate for a control object and the control object candidate determination section of the air conditioner (the control object 2) outputs "air conditioner" to the communication network as a candidate for a control object, the control object and content determination section of the television (the control object 1) determines a control object and presents the corresponding information based on the information on candidates for a control object for the television and the information on candidates for a control object for the air conditioner obtained through the communication network. In this case, both the television and air conditioner are candidates, so the television presents information prompting reentry. The control object and content determination section of the air conditioner (the control object 2) executes a similar processing. By outputting information to the communication network, not only the candidates for a control object, information on the degree to which the apparatus is considered to be a candidate (for example, the television: 10; the air conditioner: 5), the control object and content determination sections of the controlled apparatuses 1 and 2 compare the degrees to which the apparatus is considered to be a candidate in order to determine as a control object the apparatus having a larger degree (in this case, the television). The candidates for the content of control is similarly processed by exchanging information between different controlled apparatuses.

In addition, by obtaining information on the operator from the communication network, only the apparatus to which the operator located closest can respond without causing multiple apparatuses to respond to the motion of one person (such as a pointing motion). If, for example, the operator selected by the operator selection section of the television (the control object 1) is identical to the operator selected by the operator selection section of the air conditioner (the control object 2) from the communication network, the above procedure is executed to determine either the television (the control object 1) or the air conditioner (the control object 2) as a control object. In addition, if the operators are different, the television (the control object 1) and the air conditioner (the control object 2) can execute processing based only on the attributes of the respective selected operator. In addition, information output by the monitoring section of the television (the control object 1) can be used by the control object candidate determination section, control content candidate determination section, or operator selection section of the air conditioner (the control object 2). This has an effect of providing information that cannot be monitored using only the air conditioner (information on blind spots). In addition, information output by the control object and content determination section of the air conditioner (the control object 2) can be displayed by the television (the control object 1). In this case, the output means (images, voices, or light) of each controlled apparatus can be shared among the controlled apparatuses.

The communication network may be wired (connected via network, telephone, or power lines) or wireless (using a communication medium such as electric waves, infrared rays, or supersonic waves), or may be a mixture of a wired and a wireless networks.

Thus, the third embodiment of this invention does not only provide the effects of the first and second embodiments but can also consistently and smoothly control the equipment based on the people's predetermined attribute even if each controlled apparatus includes a mechanism for individually determining an operator, a control object, and the content of control.

Figure 4:
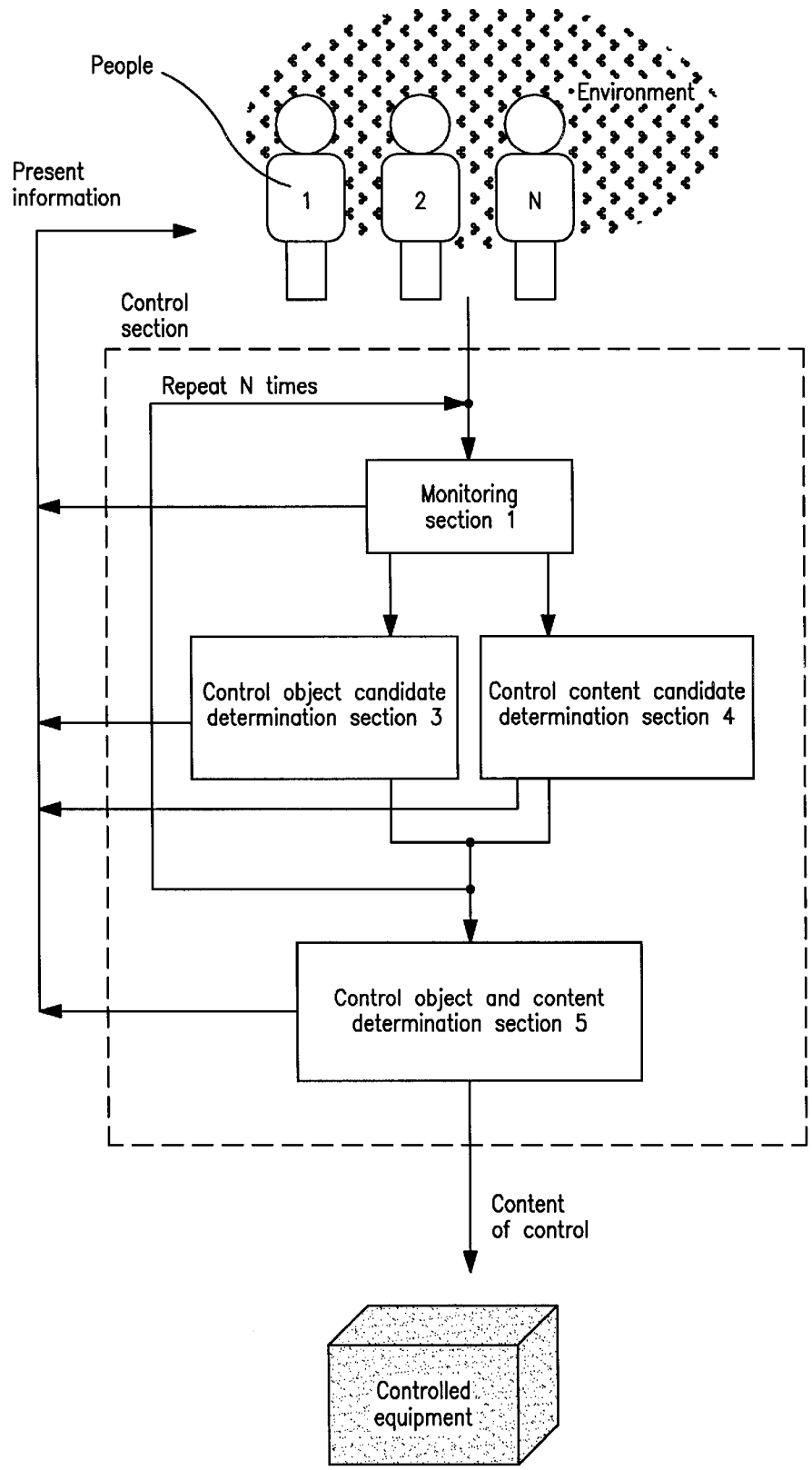
FIG. 4 is a block diagram showing a fourth embodiment of this invention.

FIG. 4 is a block diagram showing a fourth embodiment of this invention. In this figure, the operation of each section is similar to that in the first embodiment. This embodiment, however, does not include the operator selection section 2, and determines candidates for a control object and the content of control for all the people. If, for example, there are N people, the determination of candidates for a control object and the determination of candidates for the content of control are executed N times (may be concurrently executed). The control object and content determination section 5 determines a control object and the content of control based on the candidates for a control object and the content of control determined for all the people in order to execute control. The majority rule is used to determine a control object and the content of control. If, for example, there are N people and if half or more of the people issue an instruction for a decrease in the set temperature for the air conditioner, control is provided such that the temperature for the air conditioner is reduced. In addition, if the control objects and the contents of control for the respective people are consistent, the corresponding controls may be simultaneously provided. Thus, the fourth embodiment of this invention does not only provide the effects of the first embodiment but can also operate the equipment taking operations for the several people simultaneously into consideration. To execute similar processing using remote controllers, as may remote controllers as the people must always be prepared that must be operated by each person. This invention enables equipment or information to be controlled in such a way as to reflect instructions from several people without the use of a large number of remote controllers.

Figure 5:
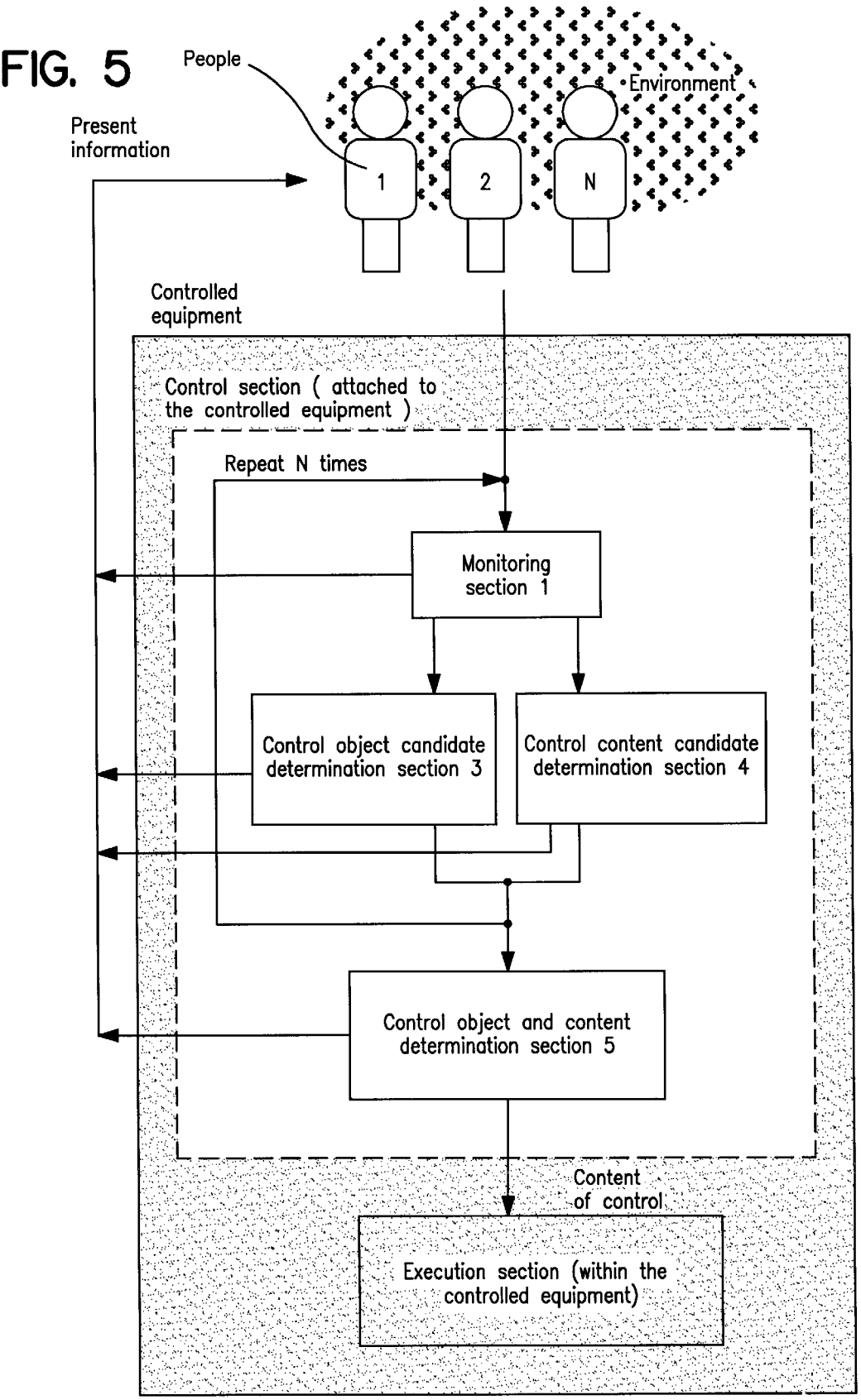
FIG. 5 is a block diagram showing a fifth embodiment of this invention.

FIG. 5 is a block diagram showing a fifth embodiment of this invention. In this figure, the operation of each section is similar to that in the fourth embodiment. In the fifth embodiment, however, the monitoring section 1, the control object candidate determination section 3, control content determination section 4, and control object and content determination section 5 are attached to a controlled apparatus (for example, the air conditioner). With this configuration, the fifth embodiment of this invention does not only provide the effects of the fourth embodiment but also requires the control object candidate determination section 3 of each apparatus to only determine whether that apparatus has been selected, thereby reducing the amount of processing required to determine candidates for a control object, compared to the fourth embodiment. This embodiment is also advantageous in that despite the free movement of the position of the equipment, the processing for determining candidates for a control object for the equipment does not need to be changed.

Figure 6:
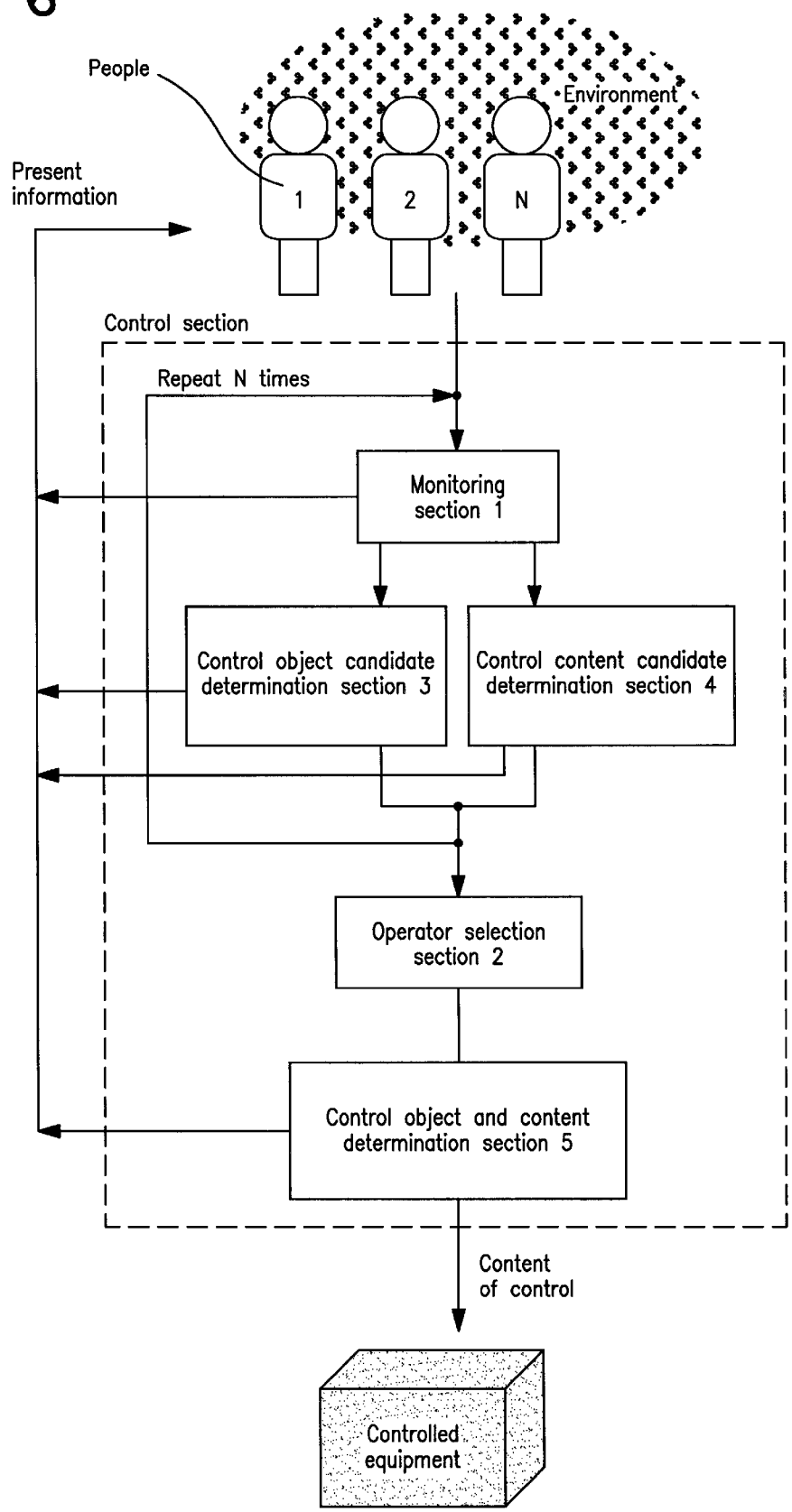
FIG. 6 is a block diagram showing a sixth embodiment of this invention.

FIG. 6 is a block diagram showing a sixth embodiment of this invention. In this figure, the operation of each section is similar to that in the first embodiment. According to the sixth embodiment, however, the control object candidate determination section 3 determines candidates for a control object for all the people, and the control content candidate determination section 4 determines candidates for the content of control for all the people. If, for example, there are N people, the determination of candidates for a control object and the determination of candidates for the content of control are executed N times (may be concurrently executed).

The operator selection section 2 determines an operator based on the candidates for a control object and the content of control for the N people. The control object and content determination section 5 determines a control object and the content of control based on the candidates for a control object and the content of control for the operator selected by the operator selection section 2.

The configuration of the sixth embodiment of this invention can provide effects similar to those of the first embodiment. In addition, by selecting an operator after candidates for a control object and the content of control have been determined, a procedure based on the candidates for a control object and the content of control can be executed by, for example, avoiding selecting as an operator those for which candidates for a control object and the content of control cannot be determined due to the ambiguity of their predetermined attribute (for example, an indicating motion).

Figure 7:
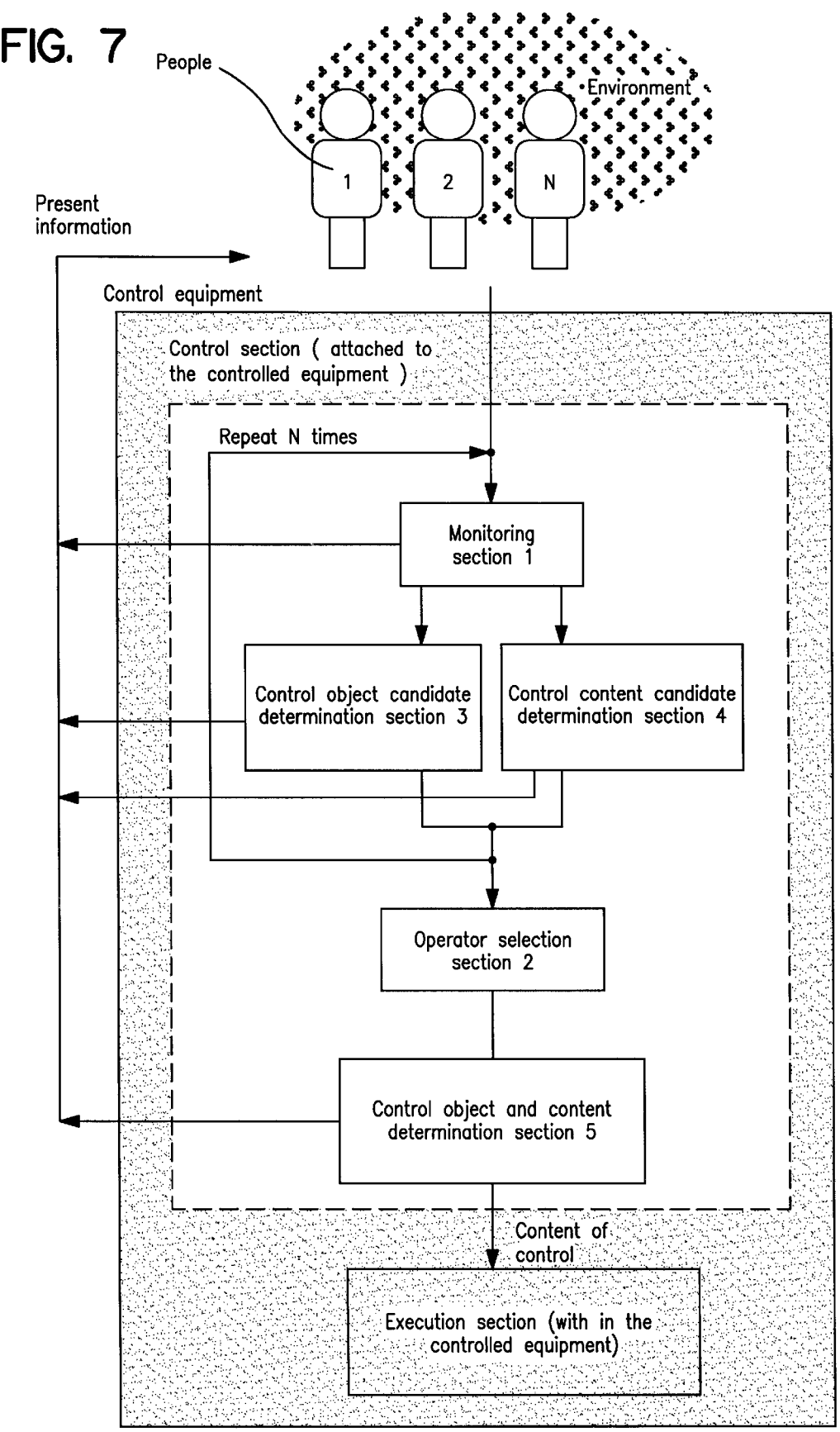
FIG. 7 is a block diagram showing a seventh embodiment of this invention.

FIG. 7 is a block diagram showing a seventh embodiment of this invention. In this figure, the operation of each section is similar to that in the sixth embodiment. In the seventh embodiment, however, the monitoring section 1, the control object candidate determination section 3, control content determination section 4, operation selection section 2, and control object and content determination section 5 are attached to a controlled apparatus (for example, the air conditioner). With this configuration, the seventh embodiment of this invention does not only provide the effects of the sixth embodiment but also requires the control object candidate determination section 3 of each apparatus to only determine whether that apparatus has been selected, thereby reducing the amount of processing required to determine candidates for a control object, compared to the sixth embodiment. This embodiment is also advantageous in that despite the free movement of the position of the equipment, the processing for determining candidates for a control object for the equipment does not need to be changed.

Figure 8:
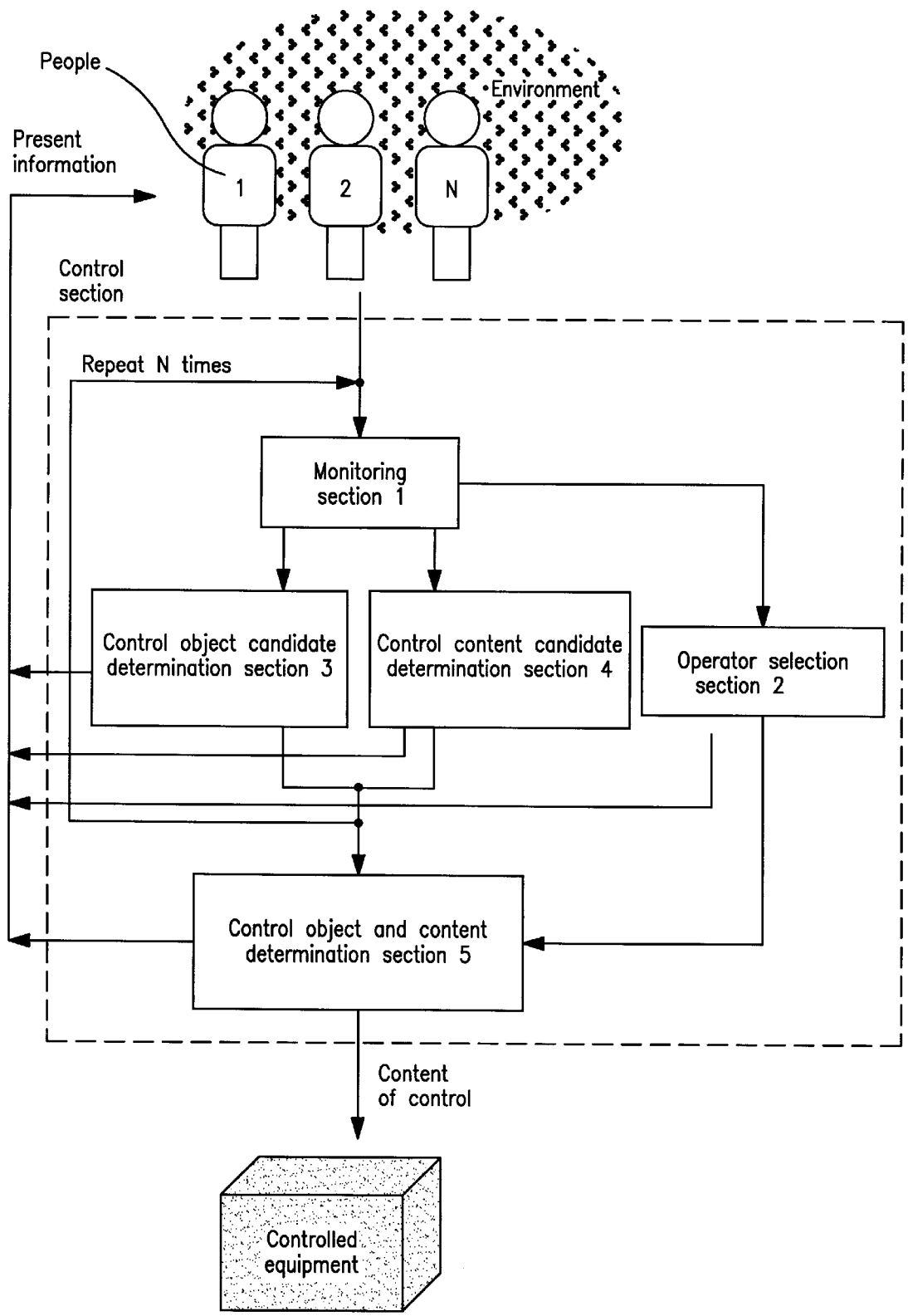
FIG. 8 is a block diagram showing an eighth embodiment of this invention.

FIG. 8 is a block diagram showing an eighth embodiment of this invention. In this figure, the operation of each section is almost similar to that in the first embodiment. According to the seventh embodiment, however, the control object candidate determination section 3 determines candidates for a control object for all the people, and the control content candidate determination section 4 determines candidates for the content of control for all the people. If, for example, there are N people, the determination of candidates for a control object and the determination of candidates for the content of control are executed N times (may be concurrently executed). The control object and content determination section 5 determines a control object and the content of control from the candidates for a control object and the content of control for the operator selected by the operator selection section 2. The configuration shown in the eighth embodiment of this invention can provide effects similar to those of the first embodiment.

Although the first to eighth embodiments have been described by assuming that the method is implemented indoors, they can be adapted for the outdoor operation of equipment. In addition to the operation of equipment, these embodiments can be adapted for the manipulation of information such as manipulation of objects on a screen or the control of screens.

This invention can be realized using hardware, or software on a computer, or their mixture.

This invention is also a program stored medium for memorizing such programs that are utilized for realizing all or part of operations of the control method according to the above mentioned present invention.

As is apparent from the above description, this invention is a control method for enabling equipment to be smoothly controlled using people's daily attributes and without forcing the people to make complicate predetermined motions, by taking into account the presence of several people or multiple apparatuses and the ambiguity of the people's motions and postures that prevent equipment or information from being smoothly operated using the people's attributes.

In addition, a control object and the content of control can be reliably identified by determining a plurality of candidates for the a control object and the content of control based on the people's predetermined attributes and using both information on candidates for a control object and the content of control to limit the total number of candidates.

Furthermore, required information can be provided for the people while a control object and the content of control can be smoothly determined by presenting the people with information on the operator and the content of candidates determined by equipment, and prompting reentry and further observing the people's attributes if a control object and the content of control cannot be determined.

Further according to the present invention information can be presented by a sound device as well as by a screen, even if there are a visually handicapped person and a sound handicapped person, they can confirm the information. Therefore the present invention is useful for welfare work.

Further when the monitor is executed intermittently, the consume power can be largely reduced. Therefore the present invention is useful for protection of the environment of the earth.

What is claimed is:

1. A control method of controlling a predetermined control object comprising the steps of:
   (a) monitoring attributes of a plurality of persons,
   (b) detecting a predetermined attribute of a predetermined person from the attributes of the plurality of persons being monitored, and
   (c) controlling the predetermined control object using the detected predetermined attribute of the predetermined person.

2. A control method according to claim 1, in which a control object is selected on the basis of the detection of a predetermined attribute of a predetermined person.

3. A control method according to claim 2, in which a set of control contents is selected on the basis of the detection of a predetermined attribute of a predetermined person.

4. A control method according to claim 1 including the steps of:

monitoring a peripheral environment of persons, and controlling the predetermined control object on the basis of detection of both a predetermined attribute of a predetermined person and a predetermined peripheral environment.

5. A control method according to claim 4, in which physical environment in the periphery of persons is used as said peripheral environment of persons.

6. A control method according to claim 4 or 5, in which said peripheral environment of persons is at least one selected from the group consisting of temperature, humidity, illuminance, sound level, state of air flow, concentration of a specific gas within air, and time.

* * * * *

UNITED STATES PATENT AND TRADEMARK OFFICE
CERTIFICATE OF CORRECTION

PATENT NO. : 6,353,764 B1
DATED : March 5, 2002
INVENTOR(S) : Imagawa et al.

It is certified that error appears in the above-identified patent and that said Letters Patent is hereby corrected as shown below:

Column 17,
Line 26, insert the word -- physical -- after the word "monitoring";
Line 27, insert the word -- physical -- after the word "predetermined";

Column 18,
Lines 2, 6, 9 and 14, insert the word -- physical -- after the word "predetermined".

Signed and Sealed this

Tenth Day of December, 2002

JAMES E. ROGAN
*Director of the United States Patent and Trademark Office*